Jan. 10, 1961  R. A. CHACE  2,967,513
ANTI-ROTATION MEANS FOR TOGGLE LOCKS
Filed March 3, 1959  2 Sheets-Sheet 1

INVENTOR.
RICHARD A. CHACE
BY
Reynolds, Beach & Christensen
ATTORNEYS

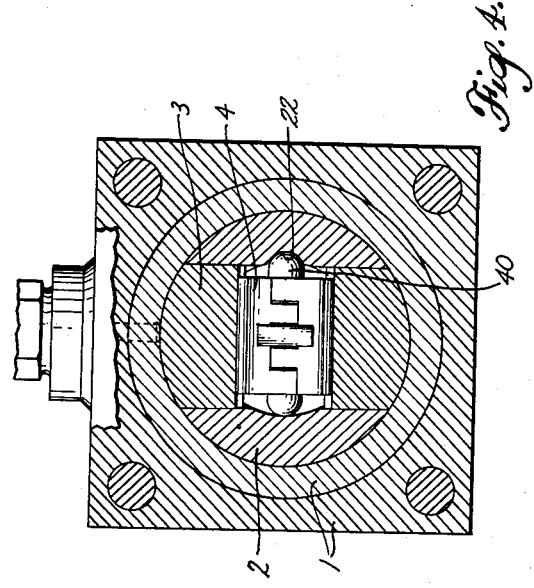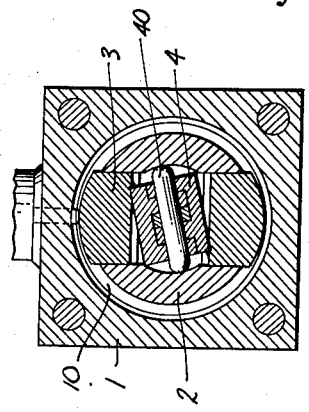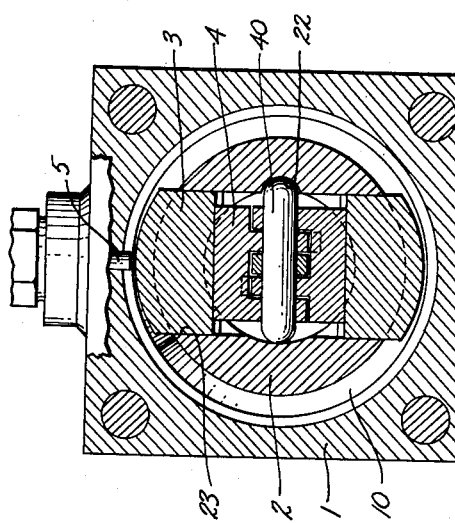

United States Patent Office 2,967,513
Patented Jan. 10, 1961

2,967,513

ANTI-ROTATION MEANS FOR TOGGLE LOCKS

Richard A. Chace, Bellevue, Wash., assignor, by mesne assignments, to Western Hydraulic & Service Company, Inc., Gardena, Calif., a corporation of California Filed Mar. 3, 1959, Ser. No. 796,942

4 Claims. (Cl. 121—40)

This invention concerns a toggle lock mechanism for locking two relatively reciprocable elements against such reciprocation when necessary, and for unlocking them to enable and usually to effect such reciprocation at appropriate times. This invention is an improvement upon the invention disclosed and claimed in Patent No. 2,744,501 dated May 8, 1956, to myself and George C. Newell, Jr. and in the patent to E. H. Bakke, No. 2,764,132, dated September 25, 1956.

Such toggle lock mechanism operatively interconnects a guiding element, for example a cylinder, and a complemental guided element, such as a piston or plunger reciprocable within the cylinder. These elements at proper times are allowed or caused to reciprocate within a given range of movement, and at other times must be locked against reciprocation at some one or more points in that range, for instance, at one limit or both, or at a midpoint. Such a lock might be required in an extending strut for a retractable aircraft undercarriage, which must lock reliably in the up and in the down positions, but must be free to extend and to contract between those positions. The toggle lock mechanism includes dog means, usually two dogs oppositively directed, guided in one of the two relatively reciprocable elements, as in the plunger, for generally radial movement between a retracted position wherein they clear the bore of the cylinder, and a projected position wherein their tips engage a stop shoulder on the other such element, the cylinder in the assumed arrangement. The movement of the dog means, at least into projected locking position, is accomplished by means of a toggle device pivotally mounted in the dog-mounting element, which by rotation into position aligned with the direction of movement of the dog means will project the latter and prevent retractive movement of the dogs. Usually a spring is active upon the toggle links, and through them upon the dogs, to effect projective movement of the latter whenever the dogs come into registry with a complemental locking shoulder on the cylinder or other guiding element. Unlocking is accomplished by applying a force to the toggle links or to their mounting element, in opposition to the projecting spring, to rotate the toggle links out of alignment with the dogs. Preferably there is no positive interconnection between the toggle links and dogs to effect retraction of the latter, but as explained in the Chace and Newell patent, retraction of the dogs occurs suddenly, after the toggle links have been rotated beyond a critical point in the unlocking direction, as a result of an axial force applied to move the locked piston and reacting between the beveled surfaces of the dogs' tips and the shoulders which they engage. Rotative unlocking movement of the toggle links precedes disengagement of the complementally beveled elements. Usually movement of the dogs follows so closely unlocking movement of the toggle links that there is no lack of contact and guidance between them, but it has been found that such is not always the case.

It has been found that in a few instances this sudden release and lack of guidance allows the toggle device to rotate slightly about the common axis, relative to the plunger or other element wherein the same is mounted. The dog means do not rotate being usually mounted in the same element within radially directed apertures. When next the toggle device is urged in the locking direction, as it is by a compression spring in the usual construction, it is cooked with relation to the dog means; the two are not precisely aligned. The force applied to urge the dog means into locking position is fairly high, and the misalignment may cause failure to move the dog means, and in any event causes gouging of the same, and deformation of the two affected parts, which becomes progressive and will require early replacement of worn parts, or may cause malfunctioning of the undercarriage or other controlled component.

The primary object of this invention is to provide a simple construction, especially such as is adapted to the toggle lock actuator of the patent referred to, which will prevent such cocking as between the dog means and the toggle device, and so will insure long and uninterrupted serviceability of the actuator as a whole.

The principles of this invention are applicable equally to a device of the nature disclosed in the patent referred to above, or to a device of the generally reversed character disclosed in the patent to Bakke referred to hereinabove.

The accompanying drawings illustrate the invention embodied in a typical form of actuator, and include a comparative view illustrating the damage which may occur in such an actuator which lacks the present invention.

Figure 3 is in general a cross-sectional view through the toggle device and associated dog means, taken substantially on the line indicated at 3—3 in Figure 1, and showing parts in the locked position.

Figure 4 is a similar cross-sectional view but showing parts in the unlocked position.

Figure 5 is a view similar to Figure 3 on a reduced scale, but illustrating exaggeratedly the possible relationship of the toggle device and the dog means in the absence of the present invention.

Figure 1:
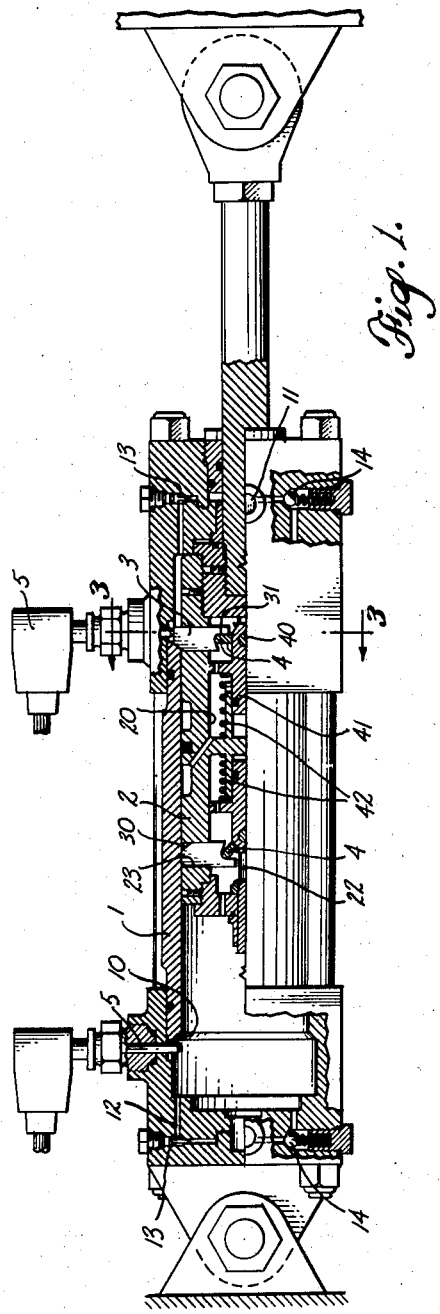
Figure 1 is in part an axial sectional view and in part an elevation of a typical actuator with parts locked in an extended position.

The actuator shown to illustrate the principles of this invention includes a guiding element or cylinder 1 and a guided element or piston 2 reciprocable axially within the cylinder. Two locking devices are employed in this particular illustration to lock the elements 1 and 2 in either of two limit positions, as, for example, in the extended position of Figure 1 or in the contracted position of Figure 2. Each such locking mechanism includes, in the form shown, a pair of oppositely radially directed dogs 3 guided in apertures 23 at the opposite ends of the piston 2 for radial movement, and each having an inwardly facing beveled shoulder 30 at its tip. These dogs, when projected, engage complementally beveled shoulders 10 at the respectively opposite ends of the bore of cylinder 1, but when the dogs 3 are retracted they will move within the perimeter of the piston 2 wherein they are guided and mounted, wherefore the piston may slide freely axially relative to the cylinder.

Projection of the dogs 3 (meaning by this their radial movement, whether outwardly in the form shown, or inwardly in a reversed form) is accomplished by toggle devices consisting essentially of toggle links 4 pivotally mounted by a pivot pin at 40 in a plunger or slide 41, axially reciprocable within a recess 20 at the corresponding end of the plunger 2. The toggle devices 4 when they come into alignment with the corresponding dog means 3 project the latter into their locking position, at which time engagement of the toggle device with a stop shoulder 31 prevents movement of the two elements materially past the aligned position, and when the dog means 3 is to be retracted or unlocked, reverse rotation of the toggle device 4 about its transverse pivot axis at 40 will allow inward movement of the dog means 3. The dog means are shown in Figure 1 in the locked position at the right and in the unlocked position at the left.

Inward or unlocking movement of the dog means 3 is preferably accomplished, not by means of any positive interconnection between the toggle link and the corresponding dog but by movement of the slide 41 in the axial direction to enable down-swinging of the toggle links, whereupon any force tending to move the piston 2 in opposition to the lock afforded by the complemental bevels 30 and 10 will induce an inwardly-directed force on the dogs by reaction between the beveled surfaces, to push the dogs suddenly inwardly. This has been explained in the Chace & Newell patent referred to above.

The slide 41 is constantly urged in the sense to effect locking by means such as the helical compression spring 42. The rather appreciable force of this spring is overcome to effect unlocking movement by an axially directed force such as hydraulic pressure applied to the outer end of the plunger 41. Hydraulic pressure when so used may be the same force that is employed to effect shifting of the piston 2 as a whole from its locked position at one limit of its range of movement towards its opposite limit. Hydraulic pressure being first admitted to the interior of the cylinder at one end urges the plunger 41 in opposition to its spring 42, and immediately upon the dogs 3 releasing in the manner described above, the same pressure effects movement of the piston 2 away from the limit position in which it was previously locked.

Hydraulic pressure to effect relative movement of the piston and cylinder is admitted at 11, and pressure is relieved from the opposite end of the cylinder by the same port, except that where it is desirable to damp the final movement of the piston a buffer arrangement is provided including a port 12 from the end of the cylinder past a restricting needle valve 13, and so to the escape port 11. In order that the buffer means may be effective, pressure is normally admitted to the cylinder past a check valve 14 rather than directly from the port 11.

Figure 2:
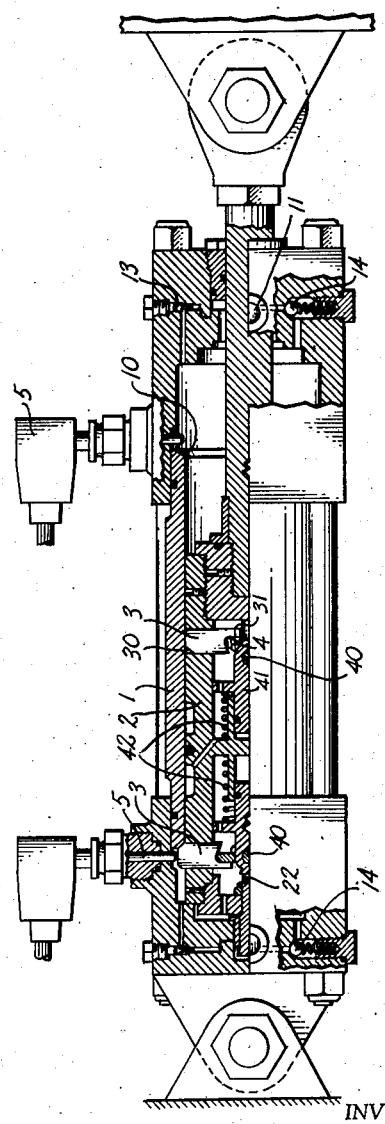
Figure 2 is a similar view but with parts locked in the retracted position.

To complete the description of the mechanism shown in Figures 1 and 2, an electric switch 5 is provided at each end of the cylinder in position to be engaged and actuated by the outward movement of the tip of each dog 3. This electric switch normally constitutes part of the control mechanism for the actuator, and is not a necessary part of the present invention.

Actuators of the type described above have been used in various installations and for the most part operate very reliably. Occasionally, however, and quite unaccountably, it was found that such actuators would fail to lock properly, and a considerable degree of wear was found to exist in the regions where the toggle links 4 and dogs 3 interengage. It was finally discovered that the cause of the difficulty lay in the torsional effect imparted to the slide 41 by the helical compression spring 42 which acts thereon, during the brief instant of release when there is lack of interconnection or guidance between the toggle links and their dogs. The torsional effect of this spring sometimes tended to rotate the slide or plunger 41, and hence the dogs 4 mounted therein by their pivot pins 40, during the brief time that the links in releasing were not closely in engagement with the suddenly disengaged dogs, but the piston 2 was not affected and did not tend to rotate, hence the dogs 3 guided in the piston did not rotate. In this manner relative rotation occurred about the axis of the actuator between the toggle links and their dog means. Such relative rotation is illustrated in Figure 5. Since the forces imposed on the parts are rather appreciable, the so-cocked parts tended to stick and the toggle links to gouge the dogs, and, conversely, the dogs tended to wear away tip portions of the toggle links. This lead to malfunctioning and unnecessary wear. To cure this, according to the present invention a means is provided to prevent relative rotation between the toggle device represented by the links 4 and the dog means represented by the dogs 3, yet without requiring positive interconnection between dogs and links, which is considered undesirable for proper functioning of the actuator as a whole. Various means might be employed to this end, but the means which finally was found entirely satisfactory is quite simple. It consists, in effect, of lengthening the pivot pin 40 of the toggle device, and of providing a groove 22 in the wall of the chamber 20 in the piston 2, in which chamber the plunger 41 reciprocates, so that regardless of the sudden release and consequent lack of guidance against relative rotary movement between links 4 and dogs 3 at the instant of unlocking the torsional effect of the spring means 42 is resisted and the toggle links 4 and dogs 3 continue always to move in a common plane rather than in planes at slight angles to one another, as indicated by Figure 5. This expedient, it has been found, prevents any cocking, sticking or undue wearing of the associated toggle devices and dog means, and insures long useful life and reliability of operation of the actuator as a whole.

I claim as my invention:

1. In combination with a guiding element and a complemental guided element relatively reciprocable throughout a given range of movement, one of said elements having a surface which is beveled with relation to the direction of reciprocation, locking dog means guided in the unbeveled element for movement transversely of the direction of reciprocation between a projected locking position and a retracted unlocked position, said dog means having a beveled tip surface complemental to the bevel of the cooperating element, and being positioned for locking interengagement of such beveled surfaces when projected into locking position, and for free relative reciprocation of said elements when retracted, a toggle device operatively engaged with but free of any connection to the dog means to project the latter into locking position as the toggle device rotates into alignment with the direction of movement of the dog means, stop means to retain the toggle device against movement in the locking direction materially past such aligned position, means to rotate the toggle device in the unlocking direction, for retraction of the dog means, means to apply a force between the relatively reciprocable elements to shift them relatively when the dog means are thus unlocked, the complemental beveled surfaces then urging the dog means into their retracted position, and means interengaged between the toggle device and the element wherein the dog means are guided, to prevent relative rotation therebetween about an axis paralleling the direction of reciprocation while the dog means are retracted.

2. The combination of claim 1, including a pivot pin carried by the unbeveled element for pivotal support of the toggle device from such element, the guiding surface of the beveled element being grooved in the direction of movement of such elements, and said pivot pin being of a length to project into said groove to constitute the rotation-preventing means.

3. In combination with a cylinder and a plunger guided within its bore for relative reciprocation throughout a given range of movement, said cylinder having a surface which is beveled with relation to the direction of reciprocation, locking dog means guided in the plunger for generally radial movement between a projected locking position and a retracted unlocked position, said dog means having a beveled tip surface complemental to the bevel of the cylinder's surface, which beveled surfaces are positioned for locking interengagement when the dog means are projected, but which are relatively radially displaced from engagement when the dog means are retracted, to allow free relative reciprocation of said elements, a toggle device, a pivot pin disposed transversely to the direction of such reciprocation and pivotally mounting said toggle device in the plunger, said toggle device being operatively connected to the dog means to project the latter into locked position when the toggle device is rotated into alignment with the direction of movement of the dog means, means to rotate the toggle device in the unlocking direction, for retraction of the dog means, means to apply a force between the cylinder and plunger to shift them relatively axially when the dog means are thus unlocked, the complemental beveled surfaces thereupon urging the dog means into unlocked position, said cylinder being grooved lengthwise of its bore, and said pivot pin being of a length to project into said groove to prevent relative rotation between the retracted dog means and the toggle device about the cylinder's axis.

4. In combination with a guiding element and a complemental guided element relatively reciprocable throughout a given range of movement, one of said elements having a shoulder, locking dog means mounted and guided in the unshouldered element for movement transversely of the direction of reciprocation between a projected locking position and a retracted unlocked position, said dog means being rotative about transverse axes and having a tip surface complemental to said shoulder, and lockingly interengaged therewith when projected, but disengaged therefrom when retracted, for relative reciprocation of said elements when unlocked, a toggle device pivotally mounted in the unshouldered element and rotative about an axis parallel to the direction of reciprocation, the toggle device being devoid of any connection to said dog means, but operatively engaged with the dog means to project the latter into locking position as the toggle device rotates about such transverse axes into alignment with the direction of movement of the dog means, or upon reverse rotation of the toggle means to allow retraction of the dog means, means to rotate the toggle device about its pivot axis, and means interengaged between the toggle device and the dog-mounting element to prevent relative rotation therebetween about an axis paralleling the direction of reciprocation while the dog means are retracted.

References Cited in the file of this patent

UNITED STATES PATENTS

| | | |
|---|---|---|
| 1,842,776 | Bogoslowsky | Jan. 26, 1932 |
| 2,685,275 | Caldwell | Aug. 3, 1954 |
| 2,744,501 | Chace et al. | May 8, 1956 |
| 2,764,132 | Bakke | Sept. 25, 1956 |